No. 820,787. PATENTED MAY 15, 1906.
M. L. HOWARTH.
GATE.
APPLICATION FILED JAN. 18, 1906.
2 SHEETS—SHEET 2.
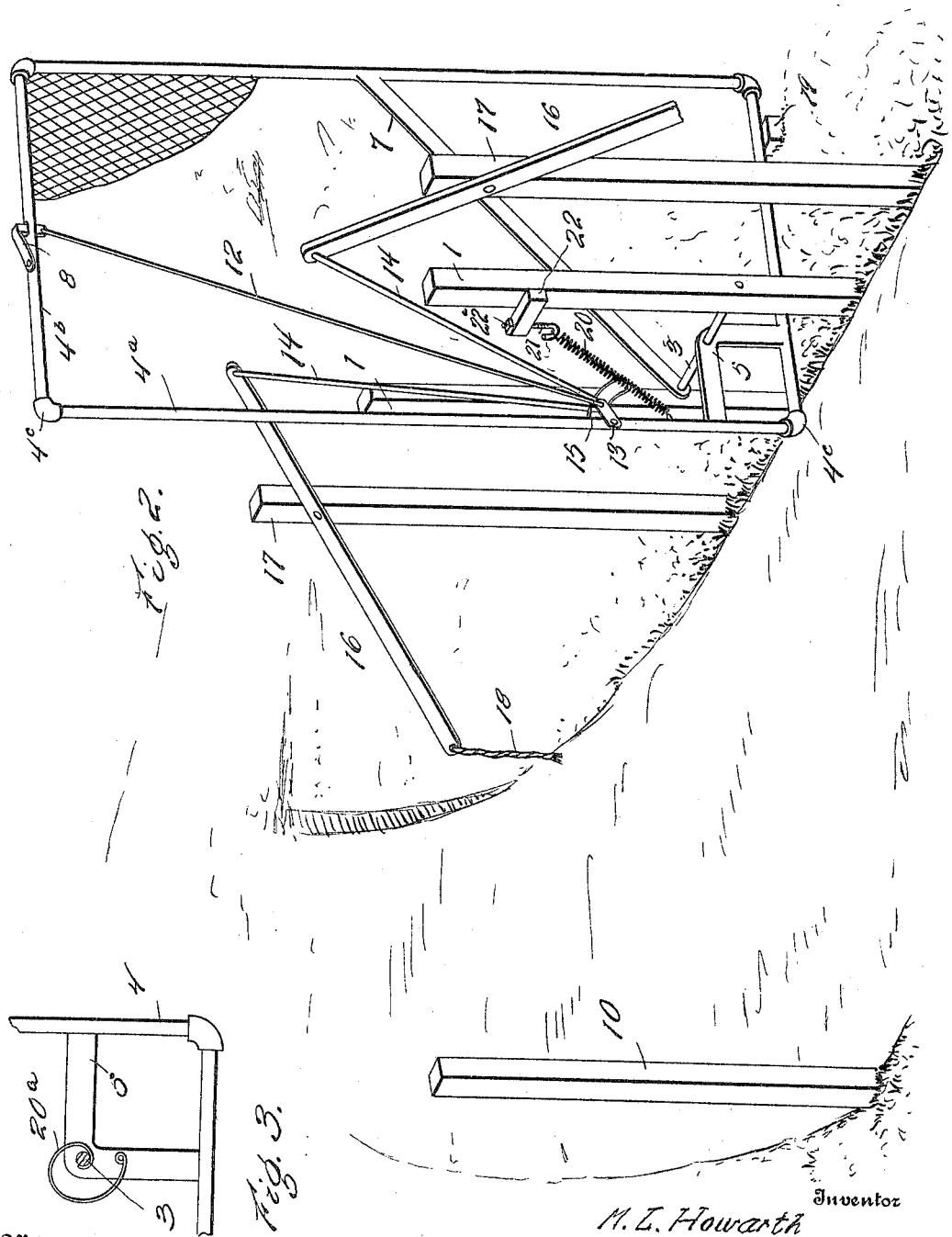

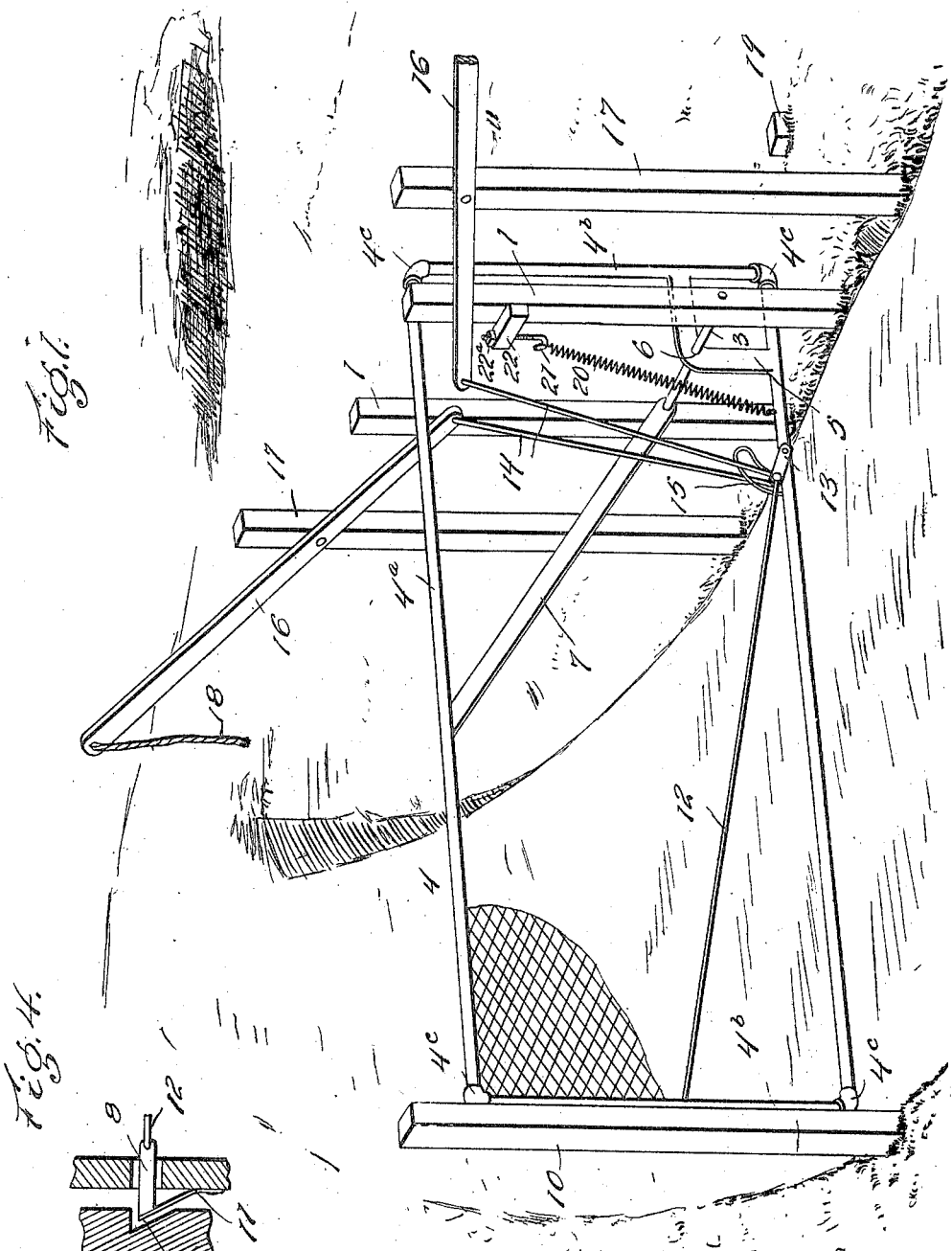

UNITED STATES PATENT OFFICE.

MELVIN L. HOWARTH, OF NORMAN, OKLAHOMA TERRITORY, ASSIGNOR OF ONE-HALF TO G. L. ABBOTT, OF NORMAN, OF OKLAHOMA TERRITORY.

GATE.

No. 820,787.  Specification of Letters Patent.  Patented May 15, 1906.

Application filed January 18, 1906. Serial No. 296,666.

*To all whom it may concern:*

Be it known that I, MELVIN L. HOWARTH, a citizen of the United States, residing at Norman, in the county of Cleveland and Territory of Oklahoma, have invented a new and useful Gate; and I do hereby declare the following to be a full, clear, and exact description of the invention, such as will enable others skilled in the art to which it appertains to make and use the same.

This invention relates to farm-gates, and has for its object to provide a gate which will not become inoperative on account of snow and ice, which will not require a great deal of strength to open it, and which can be cheaply and easily built.

Other and further objects will appear in the following description and will be more particularly pointed out in the appended claims.

In the drawings, Figure 1 is a perspective view of one embodiment of my invention, showing the gate closed. Fig. 2 is a like view of the same embodiment, showing the gate open. Fig. 3 is a detail view of another embodiment, showing the use of a volute spring. Fig. 4 is a detail sectional view showing a suitable form of a latch.

Referring more particularly to the drawings, 1 indicates a pair of parallel posts spaced apart and connected by a horizontal pivot-bar 3, which is located a short distance above the ground. Upon this pivot-bar 3 is journaled a gate-frame 4, which is of rectangular shape and is formed of two long pieces of galvanized iron piping $4^a$, forming the top and bottom of the gate, and two pieces $4^b$ of like piping, connected by elbows $4^c$ to the long pieces and forming the ends of the gate, and the whole frame is covered by a wire fabric or equivalent material. The journal for the gate is formed by a piece 5, connecting the bottom bar $4^a$ of the gate-frame and the rear end bar 4 of said frame, and provided with an opening 6, through which the pivot-bar 3 passes. This bar acts as a brace for the gate-frame, and there is also provided a brace 7, secured at its upper end and to the top bar $4^a$ and having its lower end perforated and journaled on the shaft 3, this latter brace serving to prevent sidewise movement of the gate on its pivot.

Secured to and working through the front end bar $4^b$ is a sliding bolt 8, adapted to enter a keeper-notch 9 in post 10 when the gate is closed and normally held projected by a flat spring 11, secured to bar $4^a$ at one end and to bolt 8 at the other end, this spring also preventing the bolt 8 from being driven too far inwardly.

Leading from sliding bolt 8 is a rod 12, which is connected to a link 13, pivoted to the lower bar $4^a$ of the gate-frame near its pivot. This swinging link 13 is mounted upon one side of the fabric which covers the gate-frame, and so that both gate-operating rods 14 may be connected to this link the fabric is cut to provide an arcuate slot 15. Thus the lower ends of both operating-rods 14 may be connected to the link, one directly and the other through the slot. The upper ends of these rods 14 are pivoted at 15, each to one end of one of the pivoted levers 16, which extend approximately at right angles to the gate-frame from each side thereof, being pivoted on posts 17 and having swinging handles 18 depending from their outer ends.

By pulling either one of the swinging handles 18, first the swinging latch is moved to withdraw the bolt 8, then the gate-frame is turned on its pivot, so that it moves upwardly and stands on its rear end, being supported in this position by a short post or support 19. To close the gate, the action is reversed—that is, an upward push is given to either one of the handles 18—and the rods 14, through the link 13, transmit motion to the gate to cause it to close, the bolt 8 automatically sliding into its keeper 9 when closed position is reached. It will be seen that the rods 14 are connected to the gate-frame at such a point with relation to the pivot that when the lever is operated the gate if closed will open and if open will close.

To close the gate, very little strength is required, as the weight of the gate does not have to be overcome. To make the opening of the gate also easy, I provide a spring placed under tension by the closing of the gate and adjusted in such a manner as to balance the gate.

In the embodiment shown in Figs. 1 and 2 this spring 20 is of spiral form and is secured at its lower end to the bottom bar $4^a$ of the gate-frame and at its upper end to a hook 21, which passes through an arm 22 on a post 1, a nut $22^a$, movable on the hook, and adjusting the tension of the spring.

In the embodiment shown in Fig. 3 the spring $20^a$ is of volute form, one end being secured to the rod 3 and the other to the bar 5.

If the gate is very heavy, a light spring may be mounted on the other side of the gate and secured in the same manner.

Having thus described my invention, what I claim, and desire to secure by Letters Patent, is—

1. A gate comprising a gate-frame, a pair of posts, a horizontal pivot-bar connecting the posts, an L-shaped plate provided with a journal-opening in the upper portion thereof through which the pivot-bar passes and connected to the bottom and the rear end bar of the gate-frame to brace them, and a brace extending downwardly and rearwardly from the top bar of the gate-frame and journaled on the pivot-bar.

2. A gate comprising a gate-frame, a pair of posts, a horizontal pivot-bar connecting said posts, an L-shaped plate secured to the vertical and horizontal portions of said gate and provided with a journal to receive said pivot-bar, and levers adapted to tilt said gate, substantially as described.

3. A gate pivotally mounted between two posts, a link pivotally connected to the bottom of said gate, a rod connected with said link, a lever adapted to actuate said rod, one end of said link being mounted in an arcuate slot, by which said link is adapted to unlatch said gate when the same is tilted, substantially as set forth.

In testimony whereof I have hereto affixed my signature in the presence of two witnesses.

MELVIN L. HOWARTH.

Witnesses:
M. F. McFARLAND,
B. F. WILLIAMS.